United States Patent Office 2,772,580
Patented Dec. 4, 1956

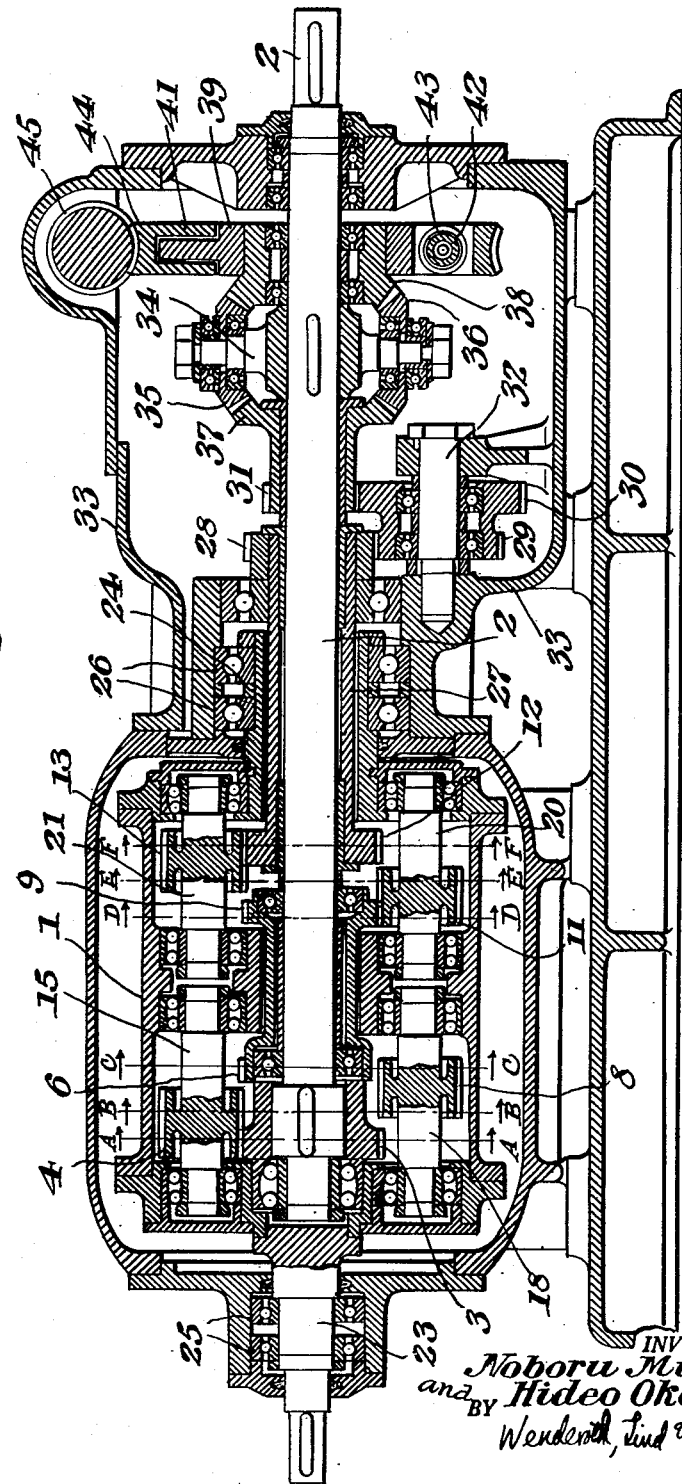

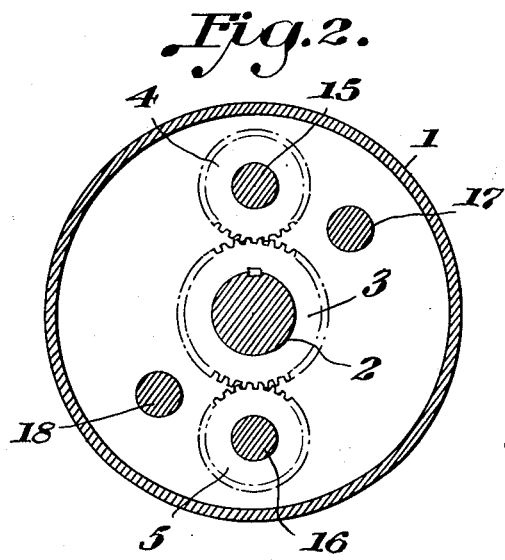
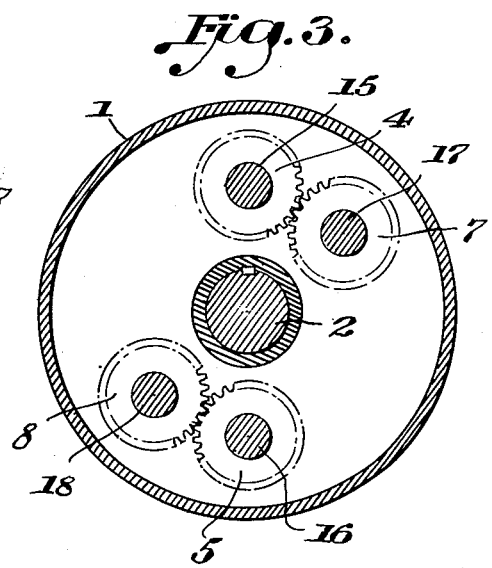
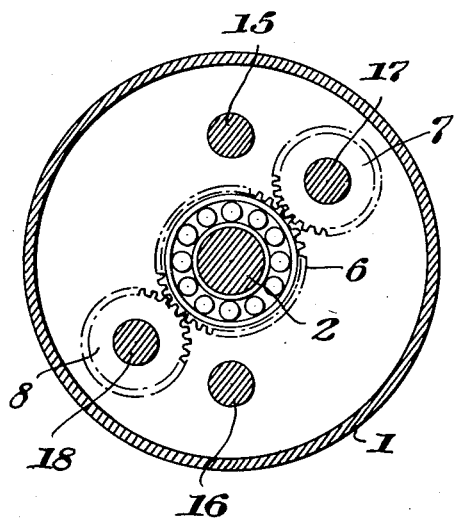
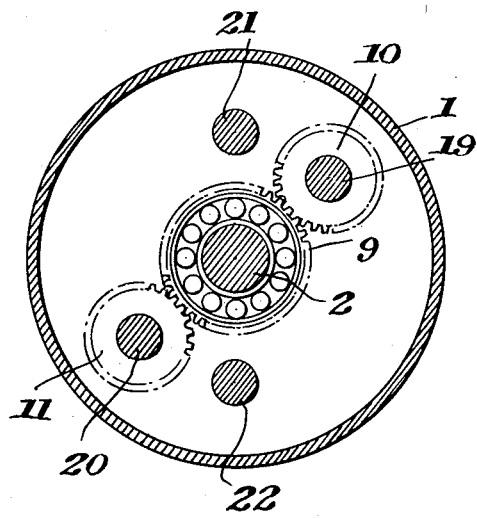

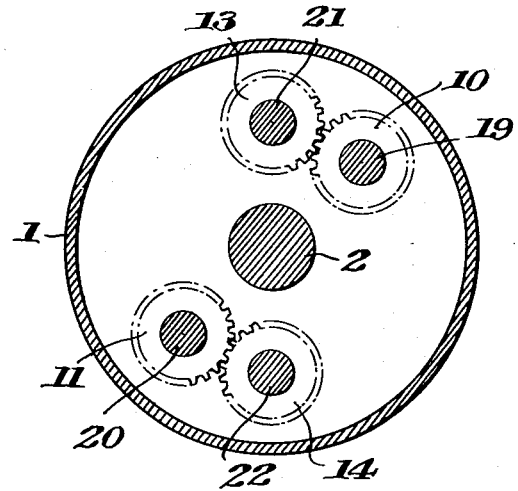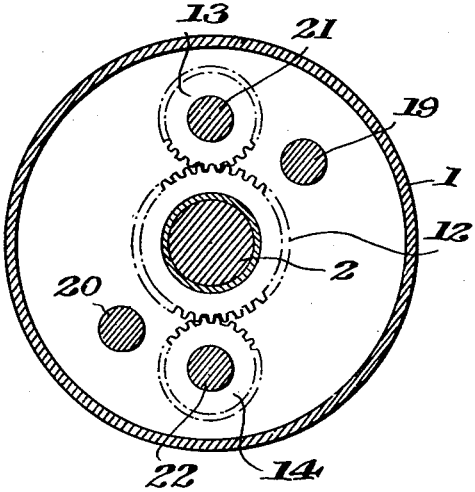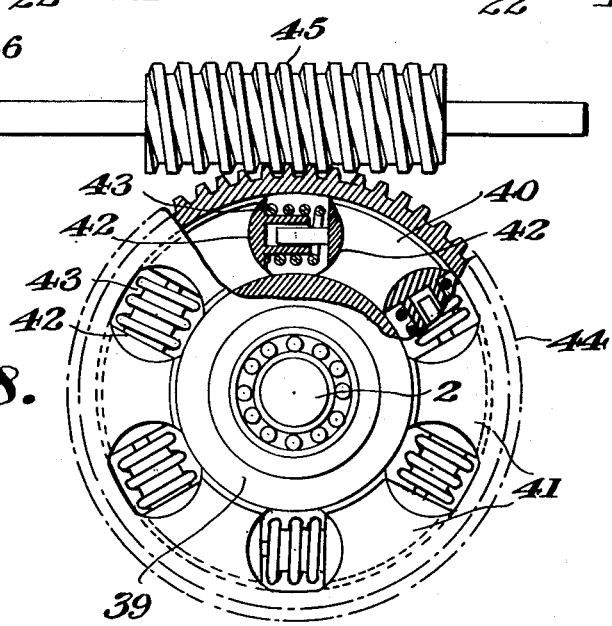

2,772,580

STEPLESS SPEED-CHANGE MECHANISM

Noboru Miura, Toyonaka City, and Hideo Oketani, Arimagun, Japan, assignors of one-half to Nobuki Yamamoto, Toyonaka City, and Seizaburo Ota, Nishinomiya City, Japan Application June 2, 1952, Serial No. 291,132

Claims priority, application Japan June 11, 1951

2 Claims. (Cl. 74—675)

This invention relates to a new stepless speed change mechanism of torque control type, and the object of the invention is to provide a mechanism to change a speed of a prime mover easily, smoothly, in a wide range and with an excellent efficiency through controlling the driving torque by means of an additional moment operated on a part of the mechanism. We call this additional moment "an inducing moment" hereafter.

Another object of the invention is to provide the mechanism in which, under constant driving power, the speed is controlled automatically in inverse ratio to the change of load, of the mechanism having a constant characteristic.

We obtain these objects by a peculiar arrangement of planetary gear mechanisms and a differential planetary gear with a step-up gear under a peculiar condition of gear-ratios between each gearing as follows.

The peculiar condition of relative values among gear ratios above mentioned causing to keep a sun gear of said differential planetary gear always stand still, unrelated to the speed of the driver and the driven shaft enables to give the sun gear an inducing moment which can be controlled easily by means of applying the forces of springs, fluid pressures or magnets or any other kind of force.

The control of the inducing moment causes the control of the driving torque and the control of the driving power and consequently the control of the speed of the driven shaft, by a so-called equilibrium condition of the power transmission.

Figure 1 is a longitudinal section of a stepless speed-change mechanism of torque control type in which two sets of planetary gear mechanism are connected in series, one set of which consists of two trains of planetary gear in a driver; Figure 2, a sectional view on the line A—A in Figure 1; Figure 3, a sectional view on the line B—B in Figure 1; Figure 4, a sectional view on the line C—C in Figure 1; Figure 5, a sectional view on the line D—D in Figure 1; Figure 6, a sectional view on the line E—E in Figure 1; Figure 7, a sectional view on the line F—F in Figure 1; Figure 8, the side view of an example of the torque control device.

Driver 1 is rotated by a prime mover, and planet gears 4 and 5 which gear into sun gear 3 fixed with a key to driven shaft 2 inserted through the driver gear respectively into planet gear 7 and 8 which gear into sun gear 6 loose to driven shaft 2. Sun gear 9 connected with sun gear 6 by a hollow shaft is loose to driven shaft 2, and planet gear 10 and 11 which gear into sun gear 9 gear respectively into planet gear 13 and 14 which gear into sun gear 12 loose to driven shaft 2. Moreover, shaft 15 of planet gear 4, shaft 16 of planet gear 5, shaft 17 of planet gear 7, shaft 18 of planet gear 8, shaft 19 of planet gear 10, shaft 20 of planet gear 11, shaft 21 of planet gear 13 and shaft 22 of planet gear 14 are all supported to the side wall of driver 1. One side wall of driver 1 is connected with driving shaft 23, another side wall of the same forms hollow shaft 24, and the both are supported by bearing 25 and 26 respectively. Hollow shaft 27 which is connected with sun gear 12 is loose to driven shaft 2 and hollow shaft 24 simultaneously, and gear 28 which is fixed to another end of hollow shaft 27 gears into gear 29, and gear 31 gears into gear 30. Gear 29 and 30 are connected and loose to shaft 32 supported in a fixed gear casing 33. The bevel type planet gears 35 and 36 provided at rotary arm 34 fixed to driven shaft 2 can be rotated freely around the said arm 34. The bevel type sun gear 37 which gears into the bevel type planet gears 35 and 36 is connected with gear 31, and loose to driven shaft 2. Another bevel type sun gear 38 which gears into planet gears 35 and 36 is also loose to driven shaft 2. Thus the bevel type planet gears 35, 36 and the bevel type sun gears 37 and 38 compose one set of the bevel type differential planetary gear. A torque control device is equipped at boss 39 connected with sun gear 38. Spring holders 42 which provide spring 43 respectively are held in the spaces between segments 40 projecting on the circumference of boss 39 overlapped by segments 41 projecting in the inside of worm gear 44. Hand-wheel 46 is equipped at the end of the shaft of a self-rocking worm 45 which gears into worm gear 44. By rotating hand-wheel 46, worm gear 44 is rotated through worm 45, accordingly one end of spring 43 is pressed through spring holder 42 by segment 41. And segment 40 at the other end of spring holder 42 is pressed by spring 43, accordingly sun gear 38 is given the inducing moment.

$n_1$—Revolution per minute of driver 1.
$N$—Revolution per minute of driven shaft 2.
$n_2$—Relative revolution per minute of planet gear 4 to sun gear 3 of the first train of the first set.
$n_2'$—Relative revolution per minute of planet gear 7 to sun gear 6 of the second train of the first set.
$n_3$—Revolution per minute of sun gear 6 of the second train of the first set and of sun gear 9 of the first train of the second set.
$n_4$—Relative revolution per minute of planet gear 10 to sun gear 9 of the first train of the second set.
$n_4'$—Relative revolution per minute of planet gear 13 to sun gear 12 of the second train of the second set.
$N_1'$—Revolution per minute of sun gear 12 of the second train of the second set and of spur gear 28.
$N_3'$—Revolution per minute of spur gears 29 and 30.
$N_2'$—Revolution per minute of spur gear 31 and of sun gear 37 of the bevel type differential planetary gear.
$N''$—Revolution per minute of sun gear 38 of the bevel type differential planetary gear.
$\gamma_1$—Gear ratio of planet gear 4 to sun gear 3 of the first train of the first set.
$\gamma_2$—Gear ratio of planet gear 7 to sun gear 6 of the second train of the first set.
$\gamma_3$—Gear ratio of planet gear 10 to sun gear 9 of the first train of the second set.
$\gamma_4$—Gear ratio of planet gear 13 to sun gear 12 of the second train of the second set.
$\gamma_5$—Gear ratio of planet gear 4 to planet gear 7 of the first set.
$\gamma_6$—Gear ratio of planet gear 10 to planet gear 13 of the second set.
$\gamma_1'$—Gear ratio of spur gear 28 to spur gear 29.
$\gamma_2'$—Gear ratio of spur gear 30 to spur gear 31.
Then $$n_2 = \gamma_1(n_1 - N)$$

$$n_2' = \frac{\gamma_1}{\gamma_5}(n_1 - N)$$

$$n_3 = \frac{\gamma_1}{\gamma_2 \gamma_5}(n_1 - N) + n_1$$

$$n_4 = \gamma_3(n_3 - n_1) = \frac{\gamma_1 \gamma_3}{\gamma_2 \gamma_5}(n_1 - N)$$

$$n_4' = \frac{1}{\gamma_6}n_4 = \frac{\gamma_1\gamma_3}{\gamma_2\gamma_5\gamma_6}(n_1-N)$$

$$N_1' = n_1 - \frac{1}{\gamma_4}n_4' = n_1 - \frac{\gamma_1\gamma_3}{\gamma_2\gamma_4\gamma_5\gamma_6}(n_1-N)$$

$$N_2' = \frac{1}{\gamma_1'\gamma_2'}N_1' = \frac{1}{\gamma_1'\gamma_2'}\left\{n_1 - \frac{\gamma_1\gamma_3}{\gamma_2\gamma_4\gamma_5\gamma_6}(n_1-N)\right\}$$

(1)

And in the bevel type differential planetary gear, there are the following relations:

$$N = \frac{N'' + N_2'}{2} \therefore N'' = 2N - N_2' \quad (2)$$

From 1 and 2

$$N'' = 2N - \frac{1}{\gamma_1'\gamma_2'}\left\{n_1 - \frac{\gamma_1\gamma_3}{\gamma_2\gamma_4\gamma_5\gamma_6}(n_1-N)\right\}$$

$$= N\left(2 - \frac{1}{\gamma_1'\gamma_2'}\frac{\gamma_1\gamma_3}{\gamma_2\gamma_4\gamma_5\gamma_6}\right) - n_1\left(\frac{1}{\gamma_1'\gamma_2'} - \frac{1}{\gamma_1'\gamma_2'}\frac{\gamma_1\gamma_3}{\gamma_2\gamma_4\gamma_5\gamma_6}\right)$$

(3)

For $N''$ to be zero unrelated to N and $n_1$, the following conditions should be simultaneously satisfied in the Formula 3:

$$2 - \frac{1}{\gamma_1'\gamma_2'}\frac{\gamma_1\gamma_3}{\gamma_2\gamma_4\gamma_5\gamma_6} = 0$$

$$\frac{1}{\gamma_1'\gamma_2'} - \frac{1}{\gamma_1'\gamma_2'}\frac{\gamma_1\gamma_3}{\gamma_2\gamma_4\gamma_5\gamma_6} = 0$$

$$\therefore \frac{\gamma_1\gamma_3}{\gamma_2\gamma_4\gamma_5\gamma_6} = 1$$

and $$\gamma_1'\gamma_2' = \frac{1}{2}$$

Namely, when the above two conditions are satisfied, sun gear 38 of the bevel type differential planetary gear is made to be always at rest unrelated to the revolution of the driver and the driven shaft.

With regard to controlling the driving torque of driver 1 when the inducing moment is given to the always resting sun gear 38, further explanation will be mentioned as follows.

In general, the moments around the shaft center of the sun gear and the planet gear in each planetary gear must be respectively under equilibrium condition. In the mechanism of this invention, the equilibrium condition is given by driving torque $Mn$, inducing moment $Mc$ and load resisting moment M. When a planet gear of radius $r_2$ supported in a driver rotates around a sun gear of radius $r_1$ fixed to a driven shaft, the circumferential velocity $V_1$ of the shaft center of the planet gear is $2\pi(r_1+r_2)n_1$; the circumferential velocity $V_2$ of the contact point of the sun gear with the planet gear is $2\pi r_1 N$; and when $n_1 > N$, the absolute instantaneous center of the revolution of the planet gear is on the straight line between the shaft center of the sun gear and the contact point of the sun gear with the planet gear. When the distance between this center and the shaft center of the planet gear is $a$, the distance between this center and the contact point of the sun gear with the planet gear is $b$, the total load resisting moment of driven shaft 2 is M, the driving force is F, and the total load resisting force is R, there are the following relations:

$$F = \frac{Mn}{r_1+r_2}, \quad R = \frac{M}{r_1}$$

The power $Mn.n_1$ which is transmitted from prime mover to driver 1 should be totally transmitted to driven shaft 2 by the equilibrium condition of power transmission if the mechanical efficiency is 100%, formulated $$2\pi Mn.n_1 = FV_1 = -RV_2 = 2\pi MN$$

So, $$\frac{E}{R} = -\frac{V_2}{V_1}$$

And from the relation of velocity vector, $$\frac{V_2}{V_1} = \frac{b}{a} \therefore \frac{F}{R} = \frac{b}{a} \therefore Fa = Rb$$

This relation shows that the moments of driving force F and total load resisting force R obviously hold equilibrium condition, having the absolute instantaneous center of the revolution of the planet gear as their axis. Thus when driving force F is constant, by travelling of the absolute instantaneous center of the revolution of the planet gear on the abovesaid straight line, the relations $Fa = Rb$ and $V_1b = V_2a$ are always formed without any irrationality, even if total load resisting moment M which acts upon driven shaft 2 may change, namely, even if R may change. And two moments, driving torque $Mn$ and total load resisting moment M are always held in equilibrium condition, having the absolute instantaneous center of the revolution of the planet gear as the shaft center. As already mentioned, in the mechanism of this invention, considering equilibrium condition of the moments around the shaft center of the sun gear and of the planet gear of each planetary gear, equilibrium condition is held by the action of three moments, namely, driving torque, inducing moment and load resisting moment. The load resisting moment here stated is formulated $-F(r_1+r_2)$. $-F$ is load resisting force, and its absolute value is always equal to that of driving force F, even if total load resisting force R, namely, total load resisting moment M may change. The load resisting force $-F$ changes only when driving force F changes. So the conclusion may be as follows. Driving torque $Mn$, inducting moment $Mc$, and load resisting moment $-F(r_1+r_2)$ which act around the shaft center of the sun gear and of the planet gear of each planetary gear are all directly unrelated to total load resisting moment M which acts upon driven shaft 2, and are not influenced by the change of M. So giving the inducing moment $Mc$ externally, the moments around the shaft center of the sun gear and of the planet gear of each planetary gear hold equilibrium condition, and the driving torque $Mn$ is controlled.

The relation between inducing moment $Mc$ and driving torque $Mn$ is formulated as follows:

$$Mc = \gamma_1'\gamma_2'\frac{1}{1+\frac{\gamma_3}{\gamma_4\gamma_6}}Mn = \alpha Mn \quad \text{(in the case of the mechanism shown in Figure 1)}$$

(4)

here $\alpha = \dfrac{\gamma_1'\gamma_2'}{1+\dfrac{\gamma_3}{\gamma_4\gamma_6}}$ = a proportional constant The above formula is the case that the inducing moment $Mc$ acts in the direction of the revolution of the driver and the result is the same when in the opposite direction.

So when inducing moment $Mc$ is changed, driving torque $Mn$ is also changed in proportion to $Mc$. When the prime mover is an induction motor, revolution of the motor changes scarcely against load, that is, revolution of the driver is nearly constant. So if the mechanical efficiency is 100%, from the equilibrium condition of power transmission;

$$\frac{1}{\alpha}Mc.n_1 = Mn.n_1 = MN$$

revolution per minute of driven shaft $$N = \frac{Mc}{\alpha M}n_1 = \frac{Mn}{M}n_1 \therefore N \sim \frac{Mc}{M}$$

or $$N \sim \frac{Mn}{M}$$

When total load resisting moment M which acts upon driven shaft 2 is constant, $$N \sim Mc \text{ or } N \sim Mn$$

The revolution of driven shaft changes in proportion to inducing moment Mc. So when Mc is increased gradually from zero, N is also increased gradually from zero, and the so-called stepless speed-change can be exercised.

When inducing moment Mc is held constant, driving torque Mn is also constant.

$$\therefore N \sim \frac{1}{M}$$

That is, the revolution of driven shaft changes in inverse ratio to total load resisting moment. In this case, when total load resisting moment M which acts upon driven shaft 2 changes, under the constant out-put characteristic, the revolution of driven shaft is changed in inverse ratio to M automatically, that is, the so-called self-control speed-change can be exercised.

The above-mentioned character of the mechanism by this invention is quite similar to that of series motor. The relation between revolution of series motor N, terminal voltage E, and load current $I_a$ is approximately formulated as follows.

$$N \sim \frac{E}{I_a}$$

In this formula, the revolution of motor is corresponding to the revolution of driven shaft in our mechanism, and terminal voltage E and load current $I_a$ are respectively corresponding to inducing moment Mc and total load resisting moment M in our mechanism.

Thus by this invention, when sun gear 38 which is always at rest is given the inducing moment through the control device, in case the total load resisting force which acts upon driven shaft 2 being constant, the revolution of driven shaft 2 can be changed steplessly from zero to the optional number. When the inducing moment is held constant, in case the total load resisting force which acts upon driven shaft 2 being changed, the revolution of driven shaft 2 is changed in inverse ratio to total load resisting force automatically. Namely, the mechanism by our invention has a peculiar character that speed-change can be exercised as the manner of the so-called automatic control type.

The abovementioned explanation is all about two sets of planetary gear mechanism, one set of which consists of two trains of planetary gear. However, optional sets may be exercised similarly. Especially the larger the number of the set, the larger denominator in the formula (4) can be, that is, the smaller the ratio of Mc to Mn can be. So in the large power speed-change gear with large driving torque Mn, the larger the number of the set, the less the controlling torque Mc can be and easy speed-change is exercised.

As to the mechanical efficiency of the stepless speed-change mechanism in this invention, owing to its characteristics, the moments which act around the shaft center of the sun gear and the planet gear of each planetary gear are the inducing moment Mc, driving torque Mn and load resisting moment $$-F(r_1+r_2) = -Mn$$

and as the total load resisting moment M does not act directly, the force which acts upon every part is small and the force which acts upon the teeth of gears is also small, even when M is considerably large and the revolution of driven shaft is small. So the power loss of every gear and every bearing is comparatively small. This is our excellent advantage which quite differs from the low efficiency condition in the conventional planetary gear with large reducing ratio in which one sun gear is fixed. According to the stepless speed-change mechanism of this invention, when the revolution of driven shaft is equal to that of the driver, in each planetary gear in the driver there being no relative motion between the planet gear and the sun gear, the power loss by gearing is nearly zero, while by the high speed revolution of the gears of the differential planetary gear and the step-up gear, there happens the power loss of gear and others. On the contrary, when the revolution of driven shaft comes very close to zero, the relative motion between the planet gear and the sun gear of each planetary gear and the power loss become large, but the revolution of the gears of the differential planetary gear and the step-up gear becomes almost zero, and the power loss of gears is nearly zero. So as a whole mechanical efficiency there is not so much difference between the former case and the latter. The mechanical efficiency in the case of two sets in the driver is the highest (88%) when the revolution of driven shaft is equal to the revolution of driver, and becomes small as the revolution of driven shaft comes to zero. And it becomes the lowest (81%) when N is nearly zero. It is an excellent character of this invention's mechanism that the whole mechanical efficiency shows favorable value within the broad range of speed. Moreover, the invention makes it possible to start the revolution of the prime mover in an unloaded condition with inducing moment Mc at zero, and to accelerate the revolution of the driven shaft from zero gradually by means of adding inducing moment gradually. Consequently remarkable decrease of the starting torque can be achieved and this serves as well for the clutching device between the prime mover and the driven shaft for no-load starting, and makes the device unnecessary. And the invention makes it possible to stop the driven shaft without stopping the prime mover by making the inducing moment Mc zero instantly. In addition, the mechanism is simple and can be light and of small type. The speed-change operation is very easy, and automatic controlling of revolution can be performed by its constant out-put characteristic. This invention offers an ideal stepless speed-change mechanism owing to these excellent faculties which suffice the necessary conditions of the speed change of all means of communication. Moreover, as one of the special characteristic of this invention, being able to hold the driving torque Mn constant notwithstanding the change of total load resisting moment M by holding the inducing moment Mc constant makes the load condition of the internal combustion engine of the means of communication to be controlled always in the highest thermal efficiency. This load condition is always held favorable unrelated to the change of running resistance as long as inducing moment Mc is held constant, resuliting in the economy of the fuel consumed. When used in the general production machine this mechanism shows also an excellent quality and effect, and proves to be truly an effective, adequate and unique industrial invention.

It is the intention to cover all equivalents of the invention above described together with all modifications and variations thereof that are within the scope of the appended claims.

We claim:

1. A torque control type stepless speed change mechanism comprising a driver having a drive shaft fixed thereto, a driven shaft coaxially inserted into the driver, a gear casing in which the drive shaft and driven shaft are journaled, a plurality of pairs of planet gear shafts journaled side by side in said driver, a plurality of pairs of planet gears mounted on said shafts and engaged with each other, a sun gear rotatable with the driven shaft and fixed to the end of said driver shaft within the driven and engaged with the first planet gear of the first pair of said pairs of planet gears, a plurality of sun gears loosely mounted on said driven shaft one connecting each of said pairs of planet gears by engagement with the second planet gear of one pair of planet gears and the first planet gear of the next adjacent pair of planet gears, a further sun gear loosely mounted on said driven shaft engaged with the second planet gear of the last of said pairs of planet gears, a projection fixed to said driven shaft, a differential planet gear rotatably mounted on said projection and geared to said further sun gear by a gear train, a reaction gear rotatably mounted on said driven shaft and engaged with said differential planetary gear, means to rotate said reaction gear to impart a torque to said differential planet gear, the relative sizes of said sun gears, planet gears and differential planet gear being such that a torque applied to said differential planet gear changes the relative speeds of said driven shaft and driver steplessly.

2. A torque control type stepless speed change mechanism comprising a drive shaft, a driver having a hollow casing with end walls fixed to the end of said drive shaft, a driven shaft positioned coaxially within said casing with the end thereof journaled adjacent said drive shaft, a hollow extension extending from the end wall of said casing opposite said drive shaft and surrounding said driven shaft, a gear casing in which the drive shaft and driven shaft are journaled, a plurality of pairs of planet gear shafts journaled side by side in said driver casing, pairs of planet gears mounted on said pairs of shafts engaged with each other, a sun gear fixed to the end of said driven shaft within the driver casing and engaged with the first planet gear of the first pair of said pairs of planet gears, a plurality of sun gears loosely mounted on said drive shaft, one connecting each of said pairs of planet gears by engagement with the second planet gear of one pair of planet gears and the first planet gear of the next adjacent pair of planet gears, a further sun gear loosely mounted on said driven shaft engaged with the second planet gear of the last of said pairs of planet gears and having a hollow shaft extending within said driver casing hollow shaft, a sun gear on the end of said hollow shaft, a step-up gear mounted on said gear casing connected with said sun gear, a projection fixed to said driven shaft, a differential planetary gear rotatably mounted on said projection, an intermediary sun gear loosely mounted on said driven shaft engaged with said step-up gear and said differential gear, a reaction gear rotatably mounted on said driven shaft and engaged with said differential planet gear, a means to rotate said reaction gear to impart a torque to said differential planet gear, the relative sizes of said sun gears, planet gears and differential planet gear being such that a torque applied to said differential planet gear changes the relative speeds of said driven shaft and driver separately.

References Cited in the file of this patent

UNITED STATES PATENTS

| 1,300,118 | Carter et al. | Apr. 8, 1919 |
| 1,590,902 | Natisch | June 29, 1926 |
| 2,154,710 | Thoma | Apr. 18, 1939 |
| 2,269,734 | Powell | Jan. 13, 1942 |

FOREIGN PATENTS

| 718,202 | France | Jan. 21, 1932 |